Patented July 21, 1931

1,815,768

UNITED STATES PATENT OFFICE

ALEXANDER GEORGIEV, OF BROOKLYN, NEW YORK, ASSIGNOR TO AEROVOX WIRELESS CORPORATION, A CORPORATION OF NEW YORK

ELECTROLYTE

No Drawing.    Application filed December 9, 1930. Serial No. 501,057.

My present invention relates to electrolytes for use in electrolytic cells and while of wider application is especially useful as the electrolyte of aluminum electrode condensers of the so-called dry type that are devoid of unabsorbed liquid.

As conducive to a clear understanding of the scope and purpose of the present invention, it is noted that when substantially dry glycerol and boric acid are used as an electrolyte in an electrolytic condenser, the forming time is generally excessive and the resulting formed aluminum electrode condenser will break down at a voltage under 400. The viscosity of the electrolyte renders the condenser bulky and series-connection of two sections and loss in capacity are involved for adaptation to circuits of 500 volts, commonly used in modern radio sets.

It is among the objects of the present invention to provide an electrolyte that has important advantages in the ease of preparation and conditioning thereof, in the facility of impregnation and of forming the condenser therewith, and in the economy in each of said steps of preparation, impregnation and forming, as well as in the material and workmanship of the electrolytic cell made with such electrolyte, and in the superiority of performance of the condenser embodying such electrolyte.

From the standpoint of preparation of the electrolyte solution, it is a more specific object to avoid the need for great precautions for elimination of traces of impurities in the materials used and to provide a solution which in fact, can be left in the open for long periods without impairment.

From the standpoint of impregnation of the condenser, it is a more specific object to provide an electrolyte by the use of which this step can be performed with great facility, without the use of costly equipment and with comparatively little labor and which involves no waste whatsoever, the electrolyte left over being capable of, or readily conditioned for re-use for impregnating successive batches of condensers.

From the standpoint of the condenser forming operation, it is a more specific object to provide an electrolyte which admits of forming the condenser by the use of simple equipment of relatively low cost, operating automatically without the need for delicate regulation or specialized supervisory skill, by which the forming operation is completed in a comparatively short time, without the use of sustained large currents, without the danger of overheating, sparking or pitting or corrosion of the foil or plates, or breakdowns, and with the formation of a highly stable di-electric film, not subject to failure even under relatively high voltages.

From the standpoint of economy and performance of the resultant condenser, it is another more specific object, to provide an electrolyte therefor, by the use of which, resort to series-connection of condenser sections for withstanding high voltages and the consequent loss in capacity are completely obviated and by which, in fact, voltages as high as 600 volts peak, useful or necessary in modern radio receiving sets, are readily accommodated.

An important feature of the invention is the use in the active principle of the electrolyte of a boron radical suitable in the forming of aluminum electrodes, but in a compound having a greatly enhanced dissociation capacity, whereby the chemical reaction is expedited, the resulting film has a high specific inductive capacity and greatly enhanced capability of withstanding high voltages.

The compound used is preferably the ammonium salt of glyceryl borate alone or admixed with glyceryl borate itself, or an alkali metal salt of glyceryl borate may be substituted for part or all of the said ammonium salt.

The above electrolyte is normally an oleaginous liquid and it is preferably used with enough added water or other thinning fluid, such as methyl alcohol to bring its viscosity at a temperature of 200 degrees F. down to between 3 and 4.5, as compared with the viscosity of water at 60 degrees F.

While the material preferably used as the electrolyte is not a common article of commerce and may be prepared to order for the purpose of the present invention, I have found it advantageous to produce the desired substance in the condenser factory by the special treatment of inexpensive well-known substances, which themselves are known to be useful in electrolytic condensers of lower voltage characteristics.

The ingredients used are preferably boric acid, glycerol and ammonia, either gaseous or as ammonia water. For producing the electrolyte, the ingredients may be combined in the proportion of one thousand (1000) grams of glycerol, six hundred and twenty (620) grams of boric acid (substantially stochiometric proportions) and fifty (50) c. c. or more of twenty-six (26%) per cent ammonia water, or the equivalent amount of ammonia gas.

While no less than the minimum proportion of ammonia water or ammonia above specified is to be used, to attain the best results, much larger proportions of this ingredient may be employed, if desired. The greater the proportion of this ingredient, the greater the percentage of ammonium glyceryl borate in the resultant electrolyte, and the less the proportion of glyceryl borate.

By the simple expedient of heating the mixture as above set forth to boiling and continuing until the boiling point at atmospheric pressure is about 130 degrees C. and holding the solution at this temperature for preferably at least five minutes, the preparation of the electrolyte is completed.

Chemical reactions are substantially completed by the process set forth as follows:

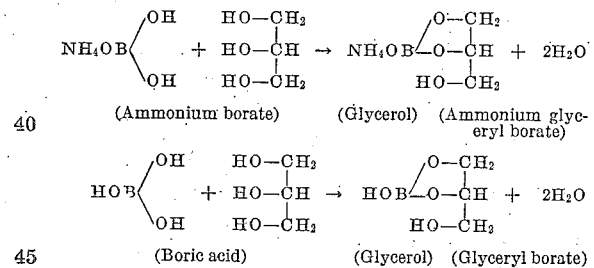

The resultant liquid is relatively fluid and will have the viscosity desired of between 3 and 4.5. The solution by virtue of its low viscosity will readily soak up into the conventional gauze interlay of a prewound condenser roll, where the latter is immersed in the solution preferably according to the teachings of my copending application Serial No. 489,521 filed October 18, 1930.

With the use of this electrolyte, a condenser is formed in a relatively short time and it will, in use, withstand a voltage considerably in excess of 500 without breakdown and have a high capacity per unit area of the anode plate.

While the electrolyte is of general application, I prefer to employ it in the condenser structure and according to the forming method disclosed and claimed in my copending application, above identified. In such use, the forming is relatively rapid, and the condenser in a single unit, without series-connection will readily withstand a peak voltage of at least 600 volts.

Prolonged ebullition of the electrolyte, which is maintained heated in the tank in which the condenser sections are impregnated during part or all of the time of impregnation, causes some or all of the free water released according to the reactions above stated to evaporate and the electrolyte becomes thicker and more viscous, and its boiling point rises, without change however in the stable chemical composition of the glyceryl borate and its ammonium salt. Such thickened electrolyte when its viscosity becomes considerably in excess of 7 for instance, is undesirable for a number of reasons among which are: a drop in the capacity, an increase in the power factor and inferiority of the filtering action of the resulting condenser, retardation in the impregnation, and greater thickness of the electrolyte in the finished condenser roll or stack with consequent increase in volume of the resultant product.

My electrolyte is readily restored to the proper degree of viscosity without impairing its properties for the present purposes, by the addition thereto of appropriate quantities of a neutral thinning liquid, such as methanol or acetone, but ordinary faucet water is quite satisfactory and is ordinarily preferred. The viscosity of the electrolyte may thus readily be maintained between the desired limits of 3 and 7, and preferably between 3 and 4.5 and the electrolyte may be used and re-used for impregnation of successive batches of condensers and without waste or impairment of the efficacy of the electrolyte.

Where water is excess of that here specified is added, or is originally present, the forming process is retarded, and corrosion of the plates or foils more likely to occur, but reasonably satisfactory results are obtained though the electrolyte in original preparation is boiled for a much less period of time than according to the preferred practice above set forth.

The invention is not limited, as above specifically set forth, to the use of boric acid or the combination of ammonia therewith. Any borate of ammonium, such as ammonium penta borate or ammonium tetra borate may be used in its stead. The boric acid present in these compounds being partially dehydrated, the reaction with glycerol may occur without further splitting out of water.

It is also within the scope of my invention to replace the ammonia and boric acid by the equivalent sodium or potassium or other alkali-metal borate.

I have also found that while glycerol is to be preferred, it may be wholly or partly replaced by any alcohol with two or more hydroxyl radicals, such, for instance as glycol, glucose, etc., all of which I have designated as a class, by the term, polyhydroxy alcohol, and all of which are embraced within the scope of the broader claims herein. In each case, the stochiometric proportions of ingredients should preferably be used as above indicated.

It will thus be seen that there is herein described an electrolyte and a method in which the several features of this invention are embodied, and which in service attain the various objects of the invention and are well suited to meet the requirements of practical use.

As many changes could be made in the above electrolyte and many apparently widely different embodiments of this invention could be made without departing from the scope thereof, it is intended that all matter contained in the above description shall be interpreted as illustrative and not in a limiting sense.

Having thus described my invention, what I claim as new and desire to secure by Letters Patent of the United States is:

1. As an electrolyte for an electrolytic cell, a liquid including more than five percent of an alkali salt of glyceryl borate and having at 200° F. a viscosity of three (3) to seven (7) inclusive as compared with the viscosity of water of 60° F.

2. As an electrolyte for an electrolytic cell, a liquid including more than five percent of the ammonium salt of glyceryl borate and having at 200° F. a viscosity of three (3) to seven (7) inclusive as compared with the viscosity of water of 60° F.

3. As an electrolyte for an electrolytic cell, a liquid including a mixture of glyceryl borate with the ammonium salt of glyceryl borate and having at 200° F. a viscosity of three (3) to seven (7) inclusive as compared with the viscosity of water of 60° F.

4. As an electrolyte for an electrolytic cell, a liquid including a mixture of glyceryl borate with an alkali salt of glyceryl borate and having at 200° F. a viscosity of three (3) to seven (7) inclusive as compared with the viscosity of water of 60° F.

5. As an electrolyte for an electrolytic cell, a liquid including a substantial proportion of an alkali salt of glyceryl borate having admixed therewith sufficient neutral thinning liquid for viscosity when at a temperature of 200 degrees F. of between 3 and 7 as compared with the viscosity of water at 60 degrees F.

6. As an electrolyte for an electrolytic cell, a liquid including a substantial proportion of an alkali salt of glyceryl borate having admixed therewith sufficient neutral thinning liquid for viscosity, when at a temperature of 200 degrees F. of between 3 and 4.5 as compared with the viscosity of water at 60 degrees F.

7. As an electrolyte for an electrolytic cell, a liquid including a mixture of glyceryl borate with the ammonium salt of glyceryl borate, said mixture including sufficient water to bring the viscosity at 200 degrees F. within the limits of 3 and 4.5, as compared with the viscosity of water at 60 degrees F.

8. The method of preparing an electrolyte for electrolytic cells, which comprises admixing alkali metal salt having a boron acid radical with a polyhydroxy alcohol and boiling until the free water and some of the water split off by the reaction is vaporized, with a resultant mixture of glyceryl borate with an alkali metal salt of glyceryl borate.

9. The method of preparing an electrolyte for electrolytic cells, which comprises admixing ammonium borate and glycerol, subjecting the mixture to boiling heat until free water and part of the water released by the reaction has been given off with a resultant combination including glyceryl borate and ammonium glyceryl borate.

10. The method of preparing an electrolyte for electrolytic cells, which consists in admixing boric acid, glycerol and ammonia water and boiling the solution.

11. The method of preparing an electrolyte for electrolytic cells which comprises subjecting a mixture of boric acid and polyhydroxy alcohol in the presence of an alkali to boiling and continuing until the boiling point at atmospheric pressure is about 130 degrees centigrade.

12. The method of preparing an electrolyte for electrolytic cells which comprises subjecting a mixture of boric acid and polyhydroxy alcohol in the presence of an alkali to boiling and continuing until the boiling point at atmospheric pressure is about 130 degrees centigrade, and maintaining the solution at this temperature for at least five minutes.

13. The method of preparing an electrolyte for electrolytic cells, which consists in admixing glycerol and boric acid with ammonia water in the proportion of 100 to 62 to 5, heating it up to 130 degrees centigrade and then boiling said mixture for at least five more minutes at atmospheric pressure.

14. The method of preparing and utilizing electrolyte liquid for electrolytic cells, which consists in admixing boric acid, polyhydroxy alcohol and ammonia water, boiling and stirring the same and maintaining the specific viscosity of the solution between the limits of 3 and 7 at 200 degrees F. by the addition of a thinner when the liquid becomes thicker.

15. The method set forth in claim 14 in which the thinner is water and is added shortly before the boiling is discontinued.

16. The method of preparing and utilizing an electrolyte for electrolytic cells which comprises admixing boric acid and glycerol in the presence of an alkali, heating the mixture and continuing the heating until the boiling point is approximately 130 degrees centigrade, and from time to time adding a neutral thinning liquid to maintain the viscosity of the solution at 200 degrees F. below 7 as compared to the viscosity of water at 60 degrees F.

17. The method of preparing and utilizing electrolyte liquid for electrolytic cells, which consists in admixing an alkali metal salt of boron and a polyhydroxy alcohol, boiling and stirring the same and maintaining the specific viscosity of the solution between the limits of 3 and 4.5 at 200 degrees F. by the addition of water when the liquid becomes thicker.

18. The method of preparing and utilizing electrolyte liquid for electrolytic cells, which consists in admixing an alkali metal salt of boron and a polyhydroxy alcohol, boiling and stirring the same and maintaining the specific viscosity of the solution between the limits of 3 and 7 at 200 degrees F. by the addition of water when the liquid becomes thicker.

Signed at New York in the county of New York and State of New York this 6th day of December, A. D. 1930.

ALEXANDER GEORGIEV.